United States Patent
Maass et al.

(10) Patent No.: US 11,081,986 B2
(45) Date of Patent: Aug. 3, 2021

(54) METHOD AND DEVICE FOR DETERMINING THE POSITION ANGLE OF A ROTOR IN AN ELECTRIC SYNCHRONOUS MACHINE

(71) Applicant: Robert Bosch GmbH, Stuttgart (DE)

(72) Inventors: Alexander Maass, Kornwestheim (DE); Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/610,414

(22) PCT Filed: Apr. 25, 2018

(86) PCT No.: PCT/EP2018/060599
§ 371 (c)(1),
(2) Date: Nov. 1, 2019

(87) PCT Pub. No.: WO2018/202508
PCT Pub. Date: Nov. 8, 2018

(65) Prior Publication Data
US 2020/0059175 A1    Feb. 20, 2020

(30) Foreign Application Priority Data
May 2, 2017    (DE) ...................... 10 2017 207 296.2

(51) Int. Cl.
*H02P 6/18* (2016.01)
*H02P 6/185* (2016.01)

(52) U.S. Cl.
CPC .................... *H02P 6/185* (2013.01)

(58) Field of Classification Search
CPC .............................. H02P 6/185; H02P 6/183
See application file for complete search history.

(56) References Cited

U.S. PATENT DOCUMENTS

| | | | |
|---|---|---|---|
| 2007/0040528 A1 | 2/2007 | Tomigashi et al. | |
| 2015/0069941 A1* | 3/2015 | Iwaji | H02P 6/183 318/400.11 |

(Continued)

FOREIGN PATENT DOCUMENTS

| | | |
|---|---|---|
| DE | 102008042360 | 4/2010 |
| EP | 2437391 | 4/2012 |

OTHER PUBLICATIONS

International Search Report for Application No. PCT/EP2018/060599 dated Jul. 10, 2018 (English Translation, 3 pages).

(Continued)

*Primary Examiner* — Cortez M Cook
(74) *Attorney, Agent, or Firm* — Michael Best & Friedrich LLP

(57) ABSTRACT

The invention relates to a method and device for determining the position angle of a rotor (2) in an electric synchronous machine (1). The device is designed to comprise: a voltage generator (12) for generating electrical voltage pulses at angles in a coordinate system fixed in respect of the stator when the rotor (2) is stationary; a measuring device (14) for measuring any electrical current value returning to the electrical voltage pulses generated by the voltage generator (12); and a computing device (16), which is designed: —to store a current signal curve of the current values measured; —to generate a zero-mean current signal curve by shifting the current signal curve or the measured current values; —to compute an integral function (83) of the zero-mean current signal curve; and—to determine the position angle of the rotor (2) on the basis of the computed integral function (83).

11 Claims, 3 Drawing Sheets

(56) References Cited

U.S. PATENT DOCUMENTS

| 2015/0134284 | A1  | 5/2015 | Negre   |           |
|--------------|-----|--------|---------|-----------|
| 2015/0207446 | A1* | 7/2015 | Kakihara | H02P 6/183 |
|              |     |        |         | 318/400.33 |
| 2015/0249411 | A1* | 9/2015 | Nakamura | H02P 6/186 |
|              |     |        |         | 318/400.3 |

OTHER PUBLICATIONS

Schroedl, "Sensorless control of AC machines at low speed and standstill based on the "INFORM" method", Industry Applications Conference, 31st IAS Annual Meeting, Conference Record of the 1996 IEEE, vol. 1, Oct. 6, 1996, pp. 270-277.

Holtz, "Initial Rotor Polarity Detection and Sensorless Control of PM Synchronous Machines", Industry Applications Conference, 2006, 41st IAS Annual Meeting, Conference Record of the 2006 IEEE, 2006, 4, 2040-2047.

* cited by examiner

METHOD AND DEVICE FOR DETERMINING THE POSITION ANGLE OF A ROTOR IN AN ELECTRIC SYNCHRONOUS MACHINE

BACKGROUND OF THE INVENTION

The present invention relates to a method and to a device for determining the position angle of a rotor of an electric synchronous machine, in particular a permanently excited synchronous machine, preferably a motor, embodied as a permanently excited synchronous machine, of a vehicle. The vehicle may be a partially electrically driven vehicle (hybrid vehicle) or a purely electrically driven vehicle (electric vehicle).

A synchronous machine is a three-phase current machine in which the rotor runs in synchronism with the rotational field of the stator. The rotational field of the stator is generated and rotated by generating electrical currents and voltages at periodically changing electrical angles. In synchronous machines the rotating stator magnetic field is generated by a multiplicity of stator windings which are offset with respect to one another, wherein the rotor has a fixedly impressed magnetization direction. Synchronous motors are frequently used as drive machines, for example as drives for vehicles, ships and trains.

In order to be able to generate a directed torque in the electric synchronous machine, the position of the rotor relative to the stator, i.e. the so-called position angle of the rotor or rotor position angle, has to be known precisely. In this context, the externally detectable mechanical position of the rotor with respect to the stator is not decisive but rather the electromagnetically active position which deviates from the mechanical position owing to the respectively present number of pole pairs and as a result of component tolerances in the rotor and the stator. To be more precise, the electrical angle between the rotor magnetic field and the stator magnetic field is decisive. In the text which follows, all the angular information is meant to refer to electrical angles only.

DE 10 2008 042 360 A1 describes the determination of a rotor angle of a synchronous machine in a stationary state, wherein voltage pulses with various electrical angles are applied to the synchronous machine.

During the determination of the rotor position angle, 180° ambiguity may occur. This is to be understood as meaning that the rotor position angle can firstly only be determined precisely up to 180°, i.e. it is not possible to differentiate, for example, between a rotor position angle of 7° and a rotor position angle of 187°.

In the scientific publications

M. Schroedl, "Sensorless control of AC machines at low speed and standstill based on the "INFORM" method", Industry Applications Conference, 1996, 31st IAS Annual Meeting, Conference Record of the 1996 IEEE, 1996, pp. 270-277 vol. 1.

and

J. Holtz, "Initial Rotor Polarity Detection and Sensorless Control of PM Synchronous Machines", Industry Applications Conference, 2006, 41st IAS Annual Meeting, Conference Record of the 2006 IEEE, 2006, 4, 2040-2047, describe methods which can resolve approximately 180° ambiguity by using saturation pulses.

SUMMARY OF THE INVENTION

A method for determining the position angle of a rotor of an electric synchronous machine is made available, comprising the steps: generating electrical voltage pulses with or at predetermined electrical angles in a stator-fixed coordinate system, referred to as a stator of the electric synchronous machine, when the rotor of the synchronous machine is stationary; measuring a respective electrical current value arising from the generated electrical voltage pulses; storing a current signal profile of the measured current values; generating a mean-value-free current signal profile by shifting the stored current signal profile and/or the measured current values; calculating an integral function of the mean-value-free current signal profile; and determining the position angle of the rotor on the basis of the calculated integral function of the mean-value-free current signal profile.

In particular, the meaning of the term "on the basis" within the scope of the invention is to be interpreted in a way corresponding to the term "in accordance with". In particular the meaning of the term "arising from something" within the scope of the invention is to be interpreted as corresponding to the term "resulting from something".

The generation of the voltage pulses with the predetermined electrical angles comprises generating voltage pulses and applying the generated voltage pulses to stator windings of the stator of the electric synchronous machine in such a way that the stator magnetic field is generated on the basis thereof with an angular direction in the direction of the predetermined electrical angle.

The current value which is measured for a predetermined electrical angle is to be understood as that current value which arises from the voltage pulse which is generated with this predetermined electrical angle.

The mean-value-free current signal profile is to be understood as being a current signal profile which has a mean value of zero.

In order to permit the position angle of the rotor to be acquired precisely, the electrical voltage pulses are preferably generated in such a way that the rotor is not made to rotate by the electrical voltage pulses, i.e. not rotated. The correspondingly limited possible magnitude of the voltage pulses usually degrades a signal-to-noise ratio, which is, however, at least compensated by the method steps described here.

A respective electrical angle which is increased by 180° is also predetermined for each predetermined angle (that is to say, for example, an electrical angle of 187° is also predetermined for an electrical angle of 7°). In this case, the storage of the current signal profile of the current values particularly preferably takes place in accordance with (e.g. as a function of) only angles in one half of 360°, wherein the value for each predetermined electrical angle in the one half of 360° is acquired both from at least one current value which is measured for this predetermined electrical angle and from at least one current value which is measured for the predetermined electrical angle which is shifted by 180°. In other words, the measured current values for electrical angles in the other half of 360° can be assigned, or in other words are assigned, to electrical angles in the one half of 360°, wherein for the storage of the current signal profile it can be disregarded whether a determined measured current value came originally from the one half or the other half of 360°.

The one half of angles of 360° can lie, for example, between 0° and <180°, so that the other half of 360° extends from 180° to <360°. Therefore, each of the measured electrical current values for, for example, the predetermined electrical angle of 183° (in the other half) can be assigned to the electrical angle of 3° in the one half, so that the current signal profile for the electrical angle of 3° is correspondingly generated or stored both with a value based on the current value or current values measured for 3° as well as with a value based on the current value or current values measured for 183°.

The meaning of the term "based" is to be configured within the scope of the invention as corresponding to the term "in accordance with".

Depending on whether a single electrical voltage pulse is generated per electrical angle and a corresponding electrical current value is measured or whether a plurality of electrical voltage pulses are generated and/or a plurality of electrical current values are measured, each value of the stored current signal profile is therefore advantageously based per predetermined angle in the one half of 360° on two or more values, wherein the value for each predetermined angle can be generated, in particular, by averaging or summing all of the measured current values which are assigned to this predetermined angle, i.e. e.g. for 3° by averaging or summing over all the current values measured at 3° and at 183°.

The current signal profile can be stored, in particular, in accordance with only the predetermined electrical angles, e.g. only electrical angles at intervals of 3° (e.g. 0°, 3°, 6°, . . . ). The current signal profile can therefore be embodied as a function with a discrete definition set. Alternatively, the current signal profile can also be generated or stored with values for electrical angles which lie between the predetermined electrical angles and which can be generated by interpolation.

As an alternative to the values described above it goes without saying that the one half of the angles of 360° can also extend between, for example, 15° and <195°, and the other half can extend from 195° to <15°, i.e. that the 360° can be divided into two equally large halves at any desired location, wherein the current signal profile has, as a definition range only one of the two halves of 360°.

Alternatively, the current signal profile can also be stored on the basis of the measured current values for all the predetermined electrical angles, i.e. it is not necessary for electrical angles in one half to be assigned to electrical angles in the other half. The predetermined electrical angles can be arranged distributed uniformly over 360°.

Furthermore, a device for determining the position angle of a rotor of an electric synchronous machine is made available, comprising: a voltage generating device which is configured to generate electrical voltage pulses with, or at, predetermined electrical angles in a stator-fixed coordinate system, referred to as a stator of the electric synchronous machine, when the rotor of the synchronous machine is stationary; a measuring device which is configured to measure a respective electrical current value which arises from the electrical voltage pulses generated by the voltage generating device; and a computing device which is configured:
to store a current signal profile of the measured current values;
to generate a mean-value-free current signal profile by shifting the current signal profile and/or the measured current values;
to calculate an integral function of the mean-value-free current signal profile; and
to determine the position angle of the rotor on the basis of the calculated integral function.

In one particularly preferred embodiment, the voltage generating device is configured in such a way that a respective electrical angle which is increased by 180° is also predetermined for each predetermined angle. In this embodiment, the computing device is configured to store the current signal profile of the current values in accordance with (i.e. e.g. as a function of) only angles in one half of 360°, wherein the value for each predetermined electrical angle in the one half of 360° is acquired both from at least one current value which is measured for this predetermined electrical angle and from at least one current value which is measured for the predetermined electrical angle which is shifted by 180°.

The method described here and the device described here make it possible to determine particularly precisely the position angle of the rotor of an electric synchronous machine, preferably of a permanently excited synchronous machine, even when there are relatively large stochastic measuring errors during the measurement of electric current values. Since the voltage generating device, the measuring device and a type of computing device are usually required in any case to operate the synchronous machine, the device which is described herein requires particularly few, or even no, additional elements. The device can be integrated, in particular, into a synchronous machine.

In particular, through the use of an integral function, measuring errors give rise, in contrast to methods which are based on derivative functions, to significantly fewer errors in the acquired rotor position angle.

The invention is based on the sensing of the inductance in various electrical angular directions which are not specified by the orientation of a stator winding but rather by selectively interrogating the inductance at a random angular position, wherein a random angular position can be interrogated by suitably combining at least two stator windings. In other words, by selectively applying voltages to two or more stator windings it is possible to generate the voltage pulses with the predetermined electrical angles. In principle, an external magnetic field is applied (by means of the stator on the basis of the generated voltage pulses) with a determined angular direction (i.e. with a predetermined electrical angle) and the resulting current (delayed with respect to the latter) is sensed, said current behaving according to: $u(t)=L \cdot (di/dt)$. The effective magnetic permeability of the rotor in accordance with the angle is conditioned by the material of the rotor, in particular by a combination of various materials with a different magnetic permeability, and in particular, the shaping of the rotor which is not rotationally symmetrical.

Advantageous developments and embodiments can be found in the dependent claims and in the description with reference to the figures.

According to one preferred development, the determination of the position angle of the rotor comprises the steps: determining a mean value of the calculated integral function; and determining a first angle value at which the calculated integral function intersects the determined mean value of the calculated integral function; wherein the determination of the position angle of the rotor is carried out on the basis of the determined first angle value. Therefore, an extreme value of the stored current signal profile can be determined easily and precisely and serve for determining the rotor position angle.

According to one particularly preferred development, that angle value at which the calculated integral function intersects the determined mean value of the calculated integral function during a rise in the calculated integral function from low values to relatively high values is determined as the first angle value. In this way, a maximum value of the stored current signal profile which is free of mean values can be determined easily and precisely, wherein this maximum indicates the D axis or the D' axis of the rotor in a rotor-fixed coordinate system. Both the D axis and the D' axis are fixed to the rotor; the D axis points in the direction of the position angle of the rotor, and the D axis is arranged rotated through 180° with respect to the D axis.

According to a further preferred development, in addition a second angle value is determined at which the calculated integral function intersects the determined mean value of the calculated integral function during a drop in the calculated integral function from relatively high values to relatively low values, and wherein the determination of the position angle of the rotor additionally takes place on the basis of the determined second angle value. In this way, a minimum of the mean-value-free current signal profile can be determined easily and precisely and serve to determine the rotor position angle.

According to a further preferred development, a sum and/or an average of the measured current values for the first angle value is compared with a sum and/or an average of the measured current value for a third angle value which is equal to the determined first angle value plus 180°, and wherein of the first angle value and the second angle value that angle value for which the sum and/or the average of the measured current values is larger is determined as the position angle of the rotor. Therefore, a 180° ambiguity can be resolved particularly easily.

According to a further preferred development, the determination of the position angle of the rotor also includes the steps: generating a first electrical saturation pulse electrically with the determined first angle value; measuring a first electrical current value which arises from the first electrical saturation pulse; generating a second electrical saturation pulse electrically with a third angle value which is the same as the determined first angle value plus 180°; measuring a second electrical current value which arises from the second electrical saturation pulse; determining the first angle value as a position angle if the rotor of the first electrical current value is higher than the second electrical current value, and determining the third angle value as a position angle if the rotor of the second electrical current value is higher than the first electrical current value.

According to a further preferred development, with each of the predetermined electrical angles a multiplicity of voltage pulses is generated and the electrical current values which arise in each case therefrom are measured; and the current signal profile is produced on the basis of all the measured current values. As a result, it is possible to improve the precision of the determination of the position angle of the rotor.

According to a further preferred development, the values of the stored signal profile are each provided by the mean value or the sum of all the electrical current values assigned for a respective predetermined electrical angle (e.g. in the one half of 360°).

According to a further preferred development, the voltage pulses have a pulse level of between 1 volt and 10 volts. According to a further preferred development, the voltage pulses have a pulse length of between 1 microsecond and 1000 microseconds. In any case, the voltage pulses are generated in such a way that the stationary rotor is not made to rotate by the voltage pulses, i.e. it remains stationary.

According to a further preferred development, after the decaying of each generated voltage pulse and/or after the measurement of the respective electrical current value a predetermined time period elapses before the next voltage pulse is generated. The predetermined time period can be, for example, between 1 microsecond and 500 microseconds, in particular can be 100 microseconds.

BRIEF DESCRIPTION OF THE DRAWINGS

The present invention will be explained in more detail below on the basis of the exemplary embodiments illustrated and the schematic figures of the drawings, in which.

In all the figures, identical or functionally identical elements and devices are, unless stated otherwise, provided with the same reference symbols. The numbering of method steps serves for clarity and is, in particular, not intended, unless stated otherwise, to imply a specific time sequence. In particular, a plurality of method steps can also be carried out simultaneously.

DETAILED DESCRIPTION

Figure 1:
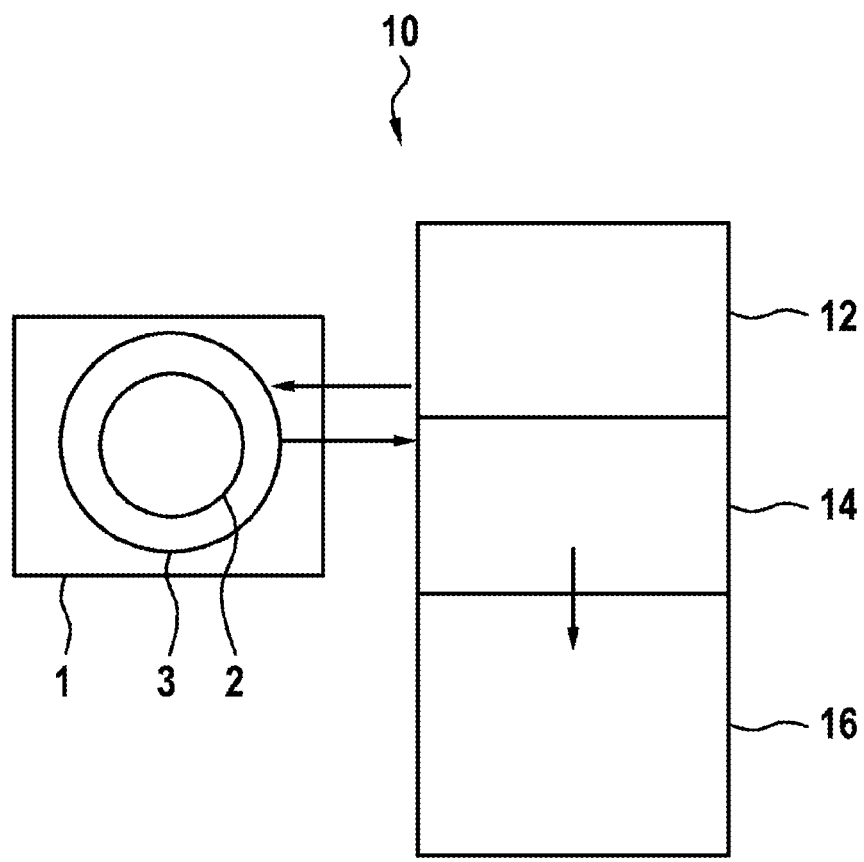
FIG. 1 shows a schematic block diagram of a device for determining the position angle of a rotor of an electric synchronous machine according to an embodiment of the present invention.

FIG. 1 shows a schematic block diagram of a device 10 for determining the position angle of a rotor 2 of an electrical permanently excited synchronous machine 1 according to an embodiment of the present invention. The device 10 can be integrated into the permanently excited synchronous machine 1, or the permanently excited synchronous machine 1 can be part of the device 10. Instead of a permanently excited synchronous machine 1, the device 10 can also be configured for application on any synchronous machine 1.

The device 10 comprises a voltage generating device 12 which is configured or designed to generate in each case at least one electrical voltage pulse with or at predetermined electrical angles in a stator-fixed coordinate system, referred to as a stator 3 of the electric synchronous machine 1, when the rotor 2 of the synchronous machine 1 is stationary, i.e. in the stationary state of the synchronous machine 1. The voltage generating device 12 is preferably configured or designed in such a way that in each case at least one electrical voltage pulse is generated for each electrical angle between 0° and, inclusively, 359°, or at any rate less than 360°.

The voltage generating device 12 is also configured in such a way that all the electrical angles which are higher than or equal to 360° ($\varphi \geq 360°$) are identified with a corresponding electrical angle ($\varphi - n*360°$, reduced by an integral multiple n of 360°, between 0° and <360°. In other words, no difference is made here between the electrical angle 15° and the electrical angle 375° (=15°+360°).

The device 10 also comprises a measuring device 14 which is designed to measure in each case at least one respective electrical current value which arises from the electrical voltage pulses generated by the voltage generating device 12. During the voltage pulses, in fact the electric current rises in accordance with the position angle of the rotor 2 or the magnetic field which is continuously generated by the rotor 2 of the permanently excited synchronous machine 1. The voltage generating device 12 is preferably embodied in such a way that the respective electrical current value is always measured at the end of the electrical voltage pulse which is generated by the voltage generating device 12.

If a particularly fast operating device 10 is required there can be provision that voltage pulses are generated only at predetermined electrical angles with angular intervals greater than 1° and current values which arise therefrom are measured. For example, voltage pulses can be generated at a total of 90 predetermined electrical angles at equal intervals between 0° and 360° (i.e. at 0°, at 4°, at 8° etc.), and current values can be measured. If a particularly precise device 10 is required, there can be provision that the voltage generating device 12 generates in each case a plurality of voltage pulses (e.g. two, three or even more) at angular intervals of 1°, and correspondingly in each case a plurality of current values for this predetermined electrical angle are measured by means of the measuring device 14. However, the same number of voltage pulses is advantageously generated for each of the predetermined angles, and the same number of current values measured.

After the generation of each voltage pulse, a pulse in the opposing direction is advantageously generated so that the current decays quickly as possible. Alternatively or additionally, after the decaying of each generated voltage pulse and/or after the measurement of the respective electrical current value a predetermined time period elapses before the next voltage pulse is generated by the voltage generating device 12, wherein the next voltage pulse can be generated to, or at the same predetermined electrical angle or at a further electrical angle which is increased, for example, by 1°. The predetermined time period is e.g. between 1 microsecond and 500 microseconds.

Voltage pulses can have a pulse level between 1 and 10 volts. The voltage generating device 12 can be configured in such a way that the voltage pulses are generated with a pulse length of between 1 microsecond and 1000 microseconds. In this context, the voltage pulses are advantageously always generated by the voltage generating device 12 in such a way that the rotor 2 is not made to rotate, i.e. not rotated, by the voltage pulses.

The device 10 also comprise a computing device 16 which can be embodied, for example, as a microcontroller, an application-specific integrated circuit (ASIC), an FPGA or a processor and a memory of a computer. The computing device 16 is configured to generate and/or store a current signal profile in accordance with angles in one half of 360°, for example in one half extending from 0° to <180°.

Figure 2:
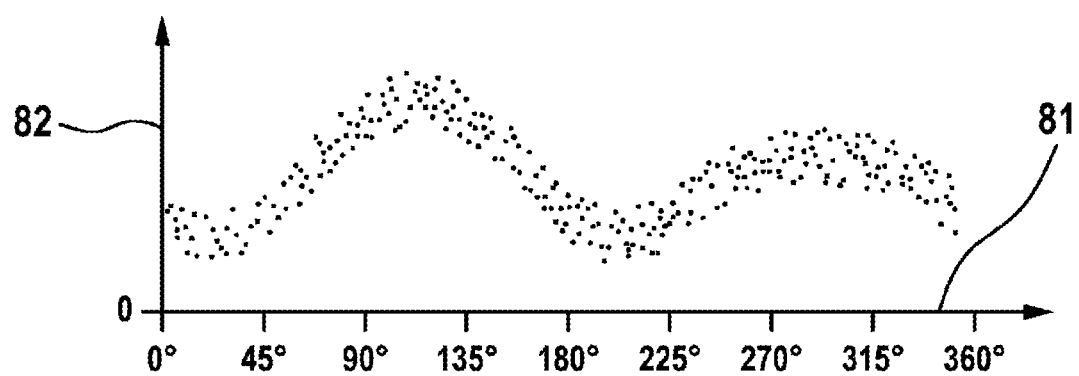
FIG. 2 to FIG. 4 show schematic illustrations explaining the methods of functioning of the device from FIG. 1.

An exemplary current signal profile of all measured current values is illustrated schematically in FIG. 2, wherein a horizontal axis 81 represents electrical angles from 0° to 360° (=0°), and a vertical axis 82 represents electrical current values.

The computing device 16 is also configured to assign each electrical current value measured at a predetermined angle in the other half of 360° (extending from 180° to <360° in the above example) to the respective predetermined angle, offset by 180°, in the one half (from 0° to <180°). In the above example, the current values which are measured for electrically 180° are assigned to the predetermined electrical angle of 0°, and the current values which are measured for electrically 181° are assigned to the predetermined electrical angle of 1° etc.

Now, in order to store the current signal profile on the basis of current values assigned to all the predetermined electrical angles in the one half (from 0° to <180°), a respective value of the current signal profile for this predetermined electrical angle is calculated, e.g. by adding all the assigned current values or by forming mean values. The result of this step is illustrated schematically in FIG. 3.

The current signal profile from 0° to <° over the measured current values can be represented in a real electrical machine by, for example, a series $$a+b*\cos(\varphi)+c*\cos(2\varphi)+d*\cos(3\varphi)+e*\cos(4\varphi)+$$

where $\varphi$ denotes the electrical angle, and a, b, c, d and e are coefficients, and where a and c are usually significantly larger than all the other coefficients.

By adding the current values of respective angles which are separated by 180° (which is carried out also during the formation of the mean values) "uneven components" such as $\cos(\varphi)$, $\cos(3\varphi)$ and so on fall away since $\cos(n*(\varphi+180°))=-\cos(n*\varphi)$, and so on for all uneven numbers n. After this step, a maximum value which can be clearly seen in FIG. 3 occurs in the one half of the angles of 360° (for example from 0° to <180°), which maximum corresponds to the D axis or the D' axis in a stator-related coordinate system.

Figure 4:
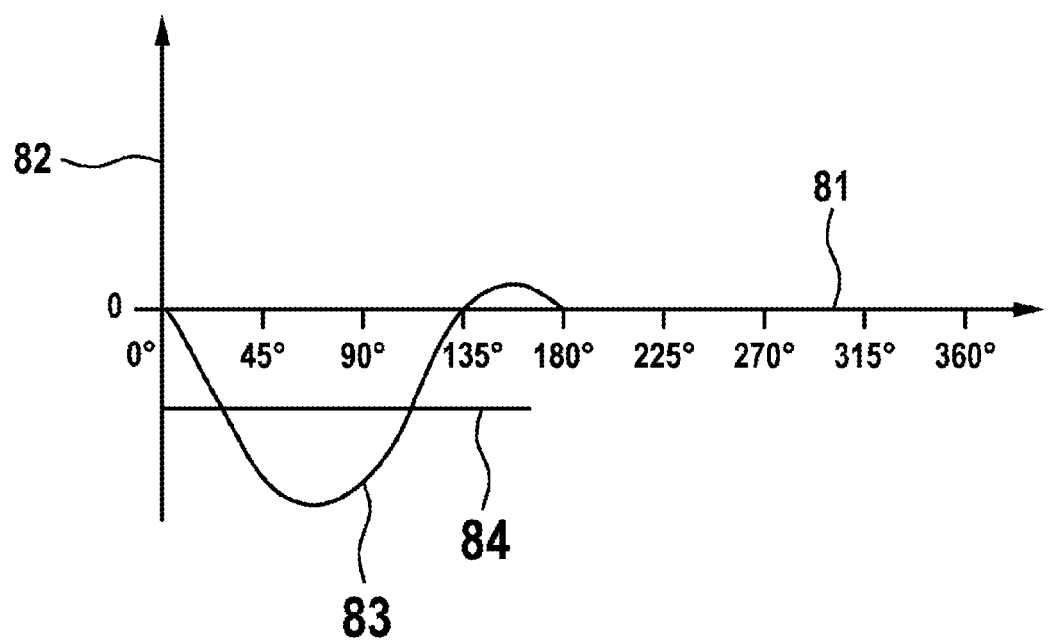

Furthermore, the computing device 16 generates a mean-value-free current signal profile which has a mean value of zero. To do this, the mean value of the stored current signal profile can be acquired and the stored current signal profile can be shifted, by subtracting the calculated mean value from all the values of the stored current signal profile, in order to obtain the mean-value-free current signal profile. The computing device 16 is also configured to calculate an integral function of the mean-value-free current signal profile. For example, a curve 83 which represents the integral function is drawn in FIG. 4.

The computing device 16 is also configured to determine the positional angle of the rotor 2 on the basis of the calculated integral function 83. This is preferably done by determining a mean value (straight line 84 in FIG. 4) of the calculated integral function 83.

Furthermore, according to this preferred variant, the computing device 16 determines a first angle value 85 at which the calculated integral function 83 intersects the determined mean value 84 of the calculated integral function 83 from bottom to top. The determination of the position angle of the rotor 2 by the computing unit 16 is advantageously done on the basis of the determined first angle value 85.

In other words, that angle value at which the calculated integral function 83 intersects the determined mean value 84 of the calculated integral function 83 during a rise in the calculated integral function 83 from low values to relatively high values is determined as the first angle value 85. In other words, that angle value is the first angle value 85 at which the integral function 83 intersects the mean value 84 from below in the graphic illustration shown in FIG. 4.

The maximum values of a function are usually acquired by means of mathematical derivation and the determination of the zero crossovers of the derivation. This procedure can have the disadvantage that in the case of measured values which are frequently present in a noisy form in practice, for the electrical currents, a discrete derivation would not supply any clear zero crossover.

A great advantage of the device 10 described here is that this maximum, which corresponds to the D axis or the D' axis, is not determined by derivation but rather by means of the integral function. This is possible because the stored current signal profile is periodic and because the exception points of the integral function with the mean value of the integral function lie at the same angles as the zero crossovers of the derivative of the current signal profile. The derivative of a cosine function is a sine function, and the integral of a cosine function is also a sine function. The computing device 16 of the device 10 makes use of this property. The integration of the acquired current values is particularly advantageous since measurement errors are significantly less or even disappear after the integration, while measurement errors would become significantly increased by a discrete derivative.

After the determination of the first angle value 85, the ambiguity which has already been explained above remains, since the actual position angle of the rotor 2 can then correspond either to the electrical first angle value 85 ($\varphi$) or to the first angle value 85 which is increased by 180° (i.e. $\varphi$+180').

In order to resolve this ambiguity, the following procedure is preferably adopted: both with the (or for the) determined electrical first angle value 85 ($\varphi$) and in the case of the (or for the) first angle value 85 which is increased by 180° (i.e. $\varphi$+180°, an electrical saturation pulse is respectively generated which can be, for example, 50 volts or more, to be precise in each case by the voltage generating device 12. As has been described above with respect to the other voltage pulses, in each case a current value can be respectively measured at the end of the saturation pulse by the measuring device 14. The computing device 16 can be configured to compare the two measured electrical current values which arise from the saturation pulses and to determine that angle value at which the electrical current value which arises from the saturation pulse is higher than the position angle of the rotor 2.

The computer device 16 can also be configured to determine not only the maximum value of the current signal profile, i.e. not only the first angle value 85 but also a second angle value 86 which corresponds to a minimum of the current signal profile. The computer device 16 can be configured to determine as second angle value 86 that angle value at which the calculated integral function 83 intersects the determined mean value 84 of the calculated integral function 83 during a drop in the calculated integral function 83 from relatively high values to relatively low values, i.e. at which the calculated integral function 83 intersects the determined mean value 84 in FIG. 4 from above.

Figure 3:
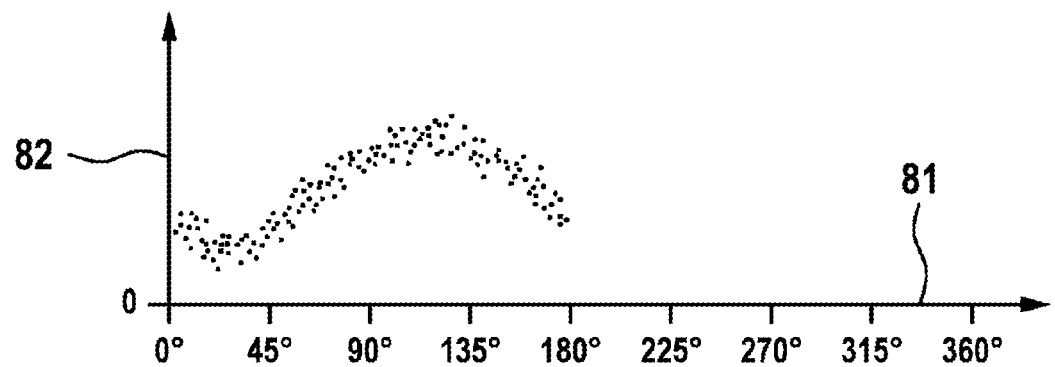

The determination of the angle value of the rotor 2 advantageously additionally takes place on the basis of the determined second angle value 86 ($\varphi$2). The minimum of the stored current signal profile in FIG. 3 is in fact shifted by 90° with respect to the maximum. Therefore, a third angle value $\varphi$3 can be determined which is the same as the second angle value 86 increased by 90° (i.e. $\varphi$3=$\varphi$2+90°, and the position angle of the rotor 2 can be determined as a mean value of the first angle value 85 and of the third angle value. Alternatively, it is possible to dispense with acquiring the second angle value 86, and the first angle value 85 can easily be determined as the position angle of the rotor 2 by the computing device 16.

In order to resolve the ambiguity, the device 10 can alternatively also be embodied in such a way that the computing device 16 compares the level of the mean value or the sum of the current values originally measured at the first angle value 85 with the level of the mean value or the sum of the current values which are measured at the first angle value 85 which is increased by 180°, and subsequently determines the angle, which has the higher mean value or the higher sum of current values in the comparison, as the position angle of the rotor 2.

Figure 5:
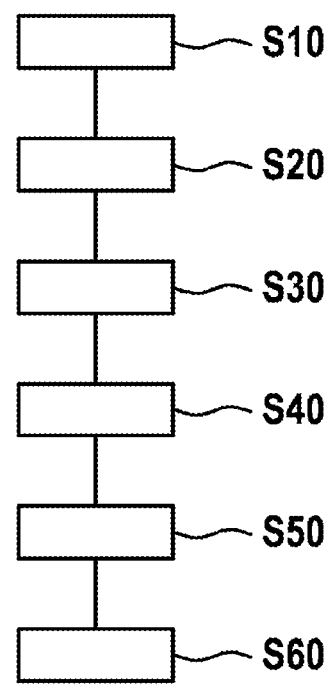
FIG. 5 shows a schematic flowchart explaining a method for determining the position angle of a rotor of an electric synchronous machine according to a further embodiment of the present invention.

FIG. 5 shows a schematic flowchart explaining a method for determining the position angle of a rotor 2 of an electric synchronous machine 1 according to a further embodiment of the present invention. The method according to FIG. 5 is, in particular, carried out with the device 10 described above and can be adapted and reverted in accordance with all the modifications, variants and developments described with reference to the device 10.

In a step S10, in each case at least one electrical voltage pulse is generated with or at predetermined electrical angles in a stator-fixed coordinate system referred to as a stator 3 of the electric synchronous machine 1, when the rotor 2 of the synchronous machine 1 is stationary, i.e. in the stationary state of the synchronous machine 1. Here a respective electrical angle which is increased by 180° is preferably predetermined at each predetermined angle. The step S10 can be carried out, in particular, by the voltage generating device 12 of the device 10, as described above.

In a step S20, in each case at least one respective electrical current value which arises from the generated electrical current pulses is measured. The step S20 can be carried out, in particular, by the measuring device 14 of the device 10, as described above.

In a step S30, a voltage signal profile of the measured current values is stored, for example as described above with respect to the computing device 16. The current signal profile is preferably produced only in accordance with angles in one half of 360°. In this context, the value at each predetermined angle in the one half of 360° is acquired both from at least one current value measured for this predetermined angle and from at least one current value measured at a predetermined angle which is increased by 180°.

In a step S40, a mean-value-free current signal profile is generated which has a mean value of zero, for example in that the stored current signal profile is correspondingly shifted upward or downward. As an alternative to this, the current values on which the current signal profile is based can also be correspondingly shifted, i.e. reduced by their mean value, prior to storing the current signal profile.

In a step S50, an integral function 83 of the mean-value-free current signal profile is calculated. In a step S60, the position angle of the rotor 2 is determined on the basis of the calculated integral function 83. The steps S30, S40, S50 and S60 can be carried out, in particular, by the computing device 16 of the device 10, as described above.

Although the present invention has been described above with reference to preferred exemplary embodiments, it is not limited thereto but rather can be modified in a variety of ways. In particular, the invention can be changed or modified in many ways without departing from the core of the invention.

The invention claimed is:

1. A method for determining the position angle of a rotor (2) of an electric synchronous machine (1), the method comprising:

generating (S10) in each case at least one electric voltage pulse with predetermined electrical angles in a stator-fixed coordinate system, referred to as a stator (3) of the electric synchronous machine (1), when the rotor (2) of the synchronous machine (1) is stationary, the at least one electrical voltage pulse being generated in such a way that the rotor is not made to rotate;

measuring (S20) in each case at least one respective electrical current value arising from the generated electrical voltage pulses;

storing (S30) a current signal profile of the measured current values corresponding to each of the predetermined electrical angles;

generating (S40) a mean-value-free current signal profile by shifting the stored current signal profile or the measured current values;

calculating (S50) an integral function (83) of the mean-value-free signal current profile; and determining (S60) the position angle of the rotor (2) on the basis of the calculated integral function (83), wherein the determination (S60) of the position angle of the rotor (2) includes determining a mean value (84) of the calculated integral function (83) and determining a first angle value (85) at which the calculated integral function (83) intersects the determined mean value (84) of the calculated integral function (83), and wherein the determination (S60) of the position angle of the rotor (2) is carried out on the basis of the determined first angle value (85).

2. The method as claimed in claim 1, wherein a respective electrical angle which is increased by 180° is also predetermined for each predetermined angle; and wherein the current signal profile of the measured current values is stored only in accordance with angles in one half of 360°, wherein the value for each predetermined electrical angle in the one half of 360° is acquired both from at least one current value which is measured for this predetermined electrical angle and from at least one current value which is measured for the predetermined electrical angle which is shifted by 180°.

3. The method as claimed in claim 1, wherein that angle value at which the calculated integral function (83) intersects the determined mean value (84) of the calculated integral function (83) during a rise in the calculated integral function (83) from low values to relatively high values is determined as the first angle value (85).

4. The method as claimed in claim 3, wherein in addition a second angle value is determined at which the calculated integral function (83) intersects the determined mean value (84) of the calculated integral function (83) during a drop in the calculated integral function (83) from relatively high values to relatively low values, and wherein the determination (S60) of the position angle of the rotor (2) additionally takes place on the basis of the determined second angle value (86).

5. The method as claimed in claim 1, wherein a sum, an average, or both of the measured current values at the first angle value (85) is compared with a sum, an average, or both of the measured current values at a third angle value which is equal to the determined first angle value (85) plus 180°, and wherein of the first angle value (85) and the second angle value that angle value for which the sum, the average, or both of the measured current values is larger is determined as the position angle of the rotor (2).

6. The method as claimed in claim 1, wherein the determination (S60) of the position angle of the rotor (2) also includes: generating a first electrical saturation pulse electrically with the determined first angle value (85); measuring a first electrical current value which arises from the first electrical saturation pulse; generating a second electrical saturation pulse electrically with a third angle value which is the same as the determined first angle value (85) plus 180°; measuring a second electrical current value which arises from the second electrical saturation pulse; determining the first angle value as a position angle of the rotor (2) if the first electrical current value is higher than the second electrical current value, and determining the third angle value as a position angle of the rotor (2) if the second electrical current value is higher than the first electrical current value.

7. The method as claimed in claim 1, wherein with each of the predetermined electrical angles a multiplicity of voltage pulses is generated and the electrical current values which arise in each case therefrom are measured; and wherein the current signal profile is stored on the basis of all the measured current values.

8. The method as claimed in claim 1, wherein the current values of the stored signal profile are each provided by the mean value or the sum of all the electrical current values acquired for a respective predetermined electrical angle.

9. The method as claimed in claim 1, wherein after the generation of each voltage pulse a pulse is generated in the opposing direction, and wherein a predetermined time period between the generation of each voltage pulse and the pulse in the opposing direction is between 1 microsecond and 500 microseconds.

10. A device (10) for determining the position angle of a rotor (2) of an electric synchronous machine (1), the device comprising:

a voltage generating device (12) which is configured to generate (S10) in each case at least one electrical voltage pulse at predetermined electrical angles in a stator-fixed coordinate system, referred to as a stator (3) of the electric synchronous machine (1), when the rotor (2) of the synchronous machine (1) is stationary, the at least one electrical voltage pulse being generated in such a way that the rotor is not made to rotate;

a measuring device (14) which is configured to measure (S20) in each case at least one respective electrical current value which arises from the electrical voltage pulses generated by the voltage generating device (12); and a computing device (16) which is configured:

to store a current signal profile of the measured current values corresponding to each of the predetermined electrical angles;

to generate a mean-value-free current signal profile by shifting the current signal profile and/or the measured current values;

to calculate an integral function (83) of the mean-value-free current signal profile; and to determine the position angle of the rotor (2) on the basis of the calculated integral function (83)

wherein the determination of the position angle of the rotor (2) includes determining a mean value (84) of the calculated integral function (83) and determining a first angle value (85) at which the calculated integral function (83) intersects the determined mean value (84) of the calculated integral function (83), and wherein the determination of the position angle of the rotor (2) is carried out on the basis of the determined first angle value (85).

11. The device (10) as claimed in claim 10, wherein the voltage generating device (12) is configured in such a way that a respective electrical angle which is increased by 180° is also predetermined for each predetermined angle; and wherein the computing device (16) is configured to store the current signal profile of the current values in accordance with only angles in one half of 360°, wherein the value for each predetermined electrical angle in the one half of 360° is acquired both from at least one current value which is measured for this predetermined electrical angle and from at least one current value which is measured for the predetermined electrical angle which is shifted by 180°.

* * * * *